United States Patent
Geiselberger et al.

(10) Patent No.: US 11,904,932 B2
(45) Date of Patent: Feb. 20, 2024

(54) STEERING SHAFT FOR A STEERING COLUMN OF A MOTOR VEHICLE AND STEERING COLUMN FOR A MOTOR VEHICLE

(71) Applicants: thyssenkrupp Presta AG, Eschen (LI); thyssenkrupp AG, Essen (DE)

(72) Inventors: Thomas Geiselberger, St. Gallen (CH); Benedikt Heigenhauser, Bern (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 444 days.

(21) Appl. No.: 17/278,731

(22) PCT Filed: Oct. 29, 2019

(86) PCT No.: PCT/EP2019/079463
§ 371 (c)(1),
(2) Date: Mar. 23, 2021

(87) PCT Pub. No.: WO2020/089199
PCT Pub. Date: May 7, 2020

(65) Prior Publication Data
US 2022/0032988 A1 Feb. 3, 2022

(30) Foreign Application Priority Data
Oct. 30, 2018 (DE) .................. 10 2018 127 098.4

(51) Int. Cl.
*B62D 1/18* (2006.01)
*B62D 1/184* (2006.01)
(Continued)

(52) U.S. Cl.
CPC .............. *B62D 1/184* (2013.01); *B62D 1/183* (2013.01); *B62D 1/185* (2013.01)

(58) Field of Classification Search
CPC ............. B62D 1/183–185; F16C 17/02; F16C 33/12–125
See application file for complete search history.

(56) References Cited

U.S. PATENT DOCUMENTS 2,247,995 A * 7/1941 Ernst .................. F16C 33/201
  384/280
5,342,091 A  8/1994 Hancock
(Continued)

FOREIGN PATENT DOCUMENTS

CN  105102300 A  11/2015
CN  108025758 A   5/2018
(Continued)

OTHER PUBLICATIONS

English Translation of International Search Report issued in PCT/EP2019/079463, dated Jan. 30, 2020.

*Primary Examiner* — Thomas C Diaz
(74) *Attorney, Agent, or Firm* — thyssenkrupp North America, LLC

(57) ABSTRACT

A steering shaft may include an inner shaft at least partially within an outer shaft where the inner shaft includes a sliding element with an outer profile portion. The outer shaft may be displaced relative to the inner shaft axially in a direction of a longitudinal axis between a storage position and an operating position. A steering column may include an inner covering pipe in which such a steering shaft is rotatably supported and an outer covering unit in which the inner covering pipe is retained. The outer shaft may have a bearing means having an inner profile portion that corresponds to the outer profile portion. In the storage position the outer profile portion is at least partially received in the bearing means.

18 Claims, 4 Drawing Sheets

(51) Int. Cl.
B62D 1/183 (2006.01)
B62D 1/185 (2006.01)

(56) References Cited

U.S. PATENT DOCUMENTS

| | | | |
|---|---|---|---|
| 10,351,161 B2* | 7/2019 | Buzzard | F16C 3/03 |
| 2015/0375768 A1 | 12/2015 | Fevre et al. | |
| 2017/0241472 A1* | 8/2017 | Walser | B62D 1/16 |
| 2017/0341677 A1 | 11/2017 | Buzzard | |
| 2017/0369091 A1* | 12/2017 | Nash | B62D 1/185 |
| 2018/0251147 A1 | 9/2018 | Heitz et al. | |

FOREIGN PATENT DOCUMENTS

| | | |
|---|---|---|
| DE | 102017104510 A | 9/2018 |
| EP | 2611673 A1 | 7/2013 |
| WO | 2012/027762 A1 | 3/2012 |

* cited by examiner

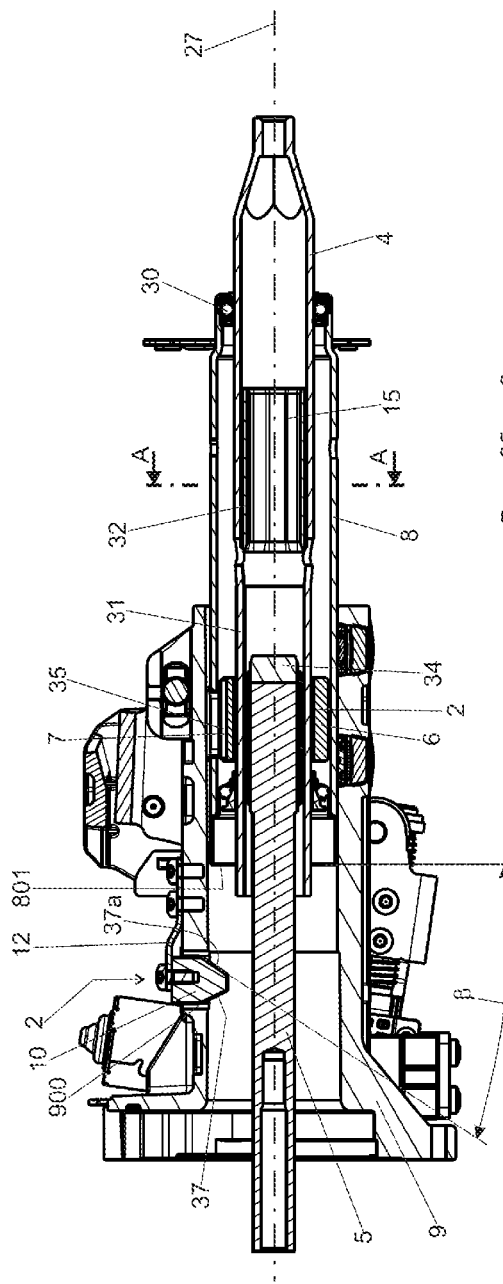
Figure 3
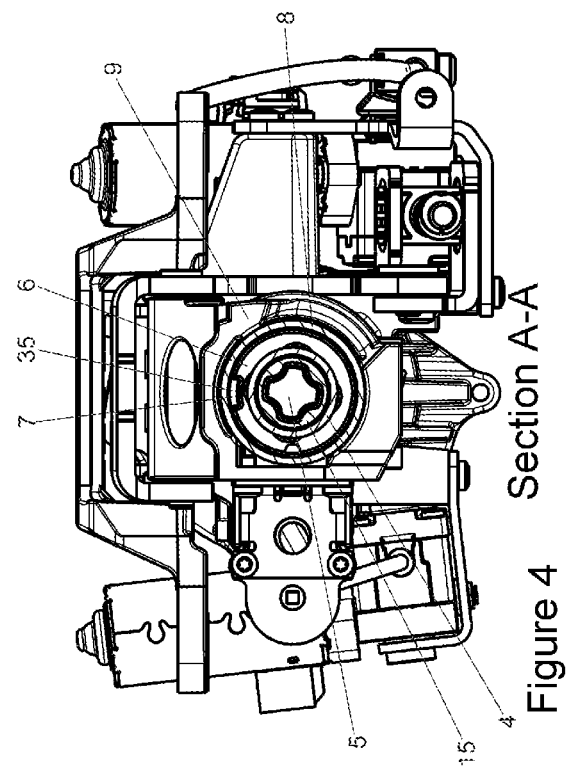
Figure 4  Section A-A

STEERING SHAFT FOR A STEERING COLUMN OF A MOTOR VEHICLE AND STEERING COLUMN FOR A MOTOR VEHICLE

CROSS REFERENCE TO RELATED APPLICATIONS

This application is a U.S. National Stage Entry of International Patent Application Serial Number PCT/EP2019/079463, filed Oct. 29, 2019, which claims priority to German Patent Application No. DE 10 2018 127 098.4, filed Oct. 30, 2018, the entire contents of both of which are incorporated herein by reference.

FIELD

The present disclosure generally relates to steering shafts, including steering shafts for steering columns of motor vehicles.

BACKGROUND

With autonomously controllable motor vehicles, the possibility of a change between automatic and manual controllability of the vehicle has to be provided, in particular during acceleration, braking and steering of the vehicle.

In the manual steering mode, a driver provides steering commands via the steering wheel in the form of an introduced steering torque, wherein the steering commands are transmitted via a steering shaft to the wheels. An electromechanical servo unit supports the vehicle driver in the manual steering mode, in which it introduces an auxiliary torque into the steering shaft or an auxiliary force into the steering system.

However, an autonomous control of the steering requires an uncoupling of the steering wheel and additional control device. In the autonomous driving mode, in which the motor vehicle travels independently, the steering maneuvers are also carried out without any intervention by the vehicle driver. The electromechanical servo unit is in this instance controlled by a control unit in such a manner that the steerable wheels are accordingly pivoted in such a manner that the motor vehicle carries out a corresponding steering maneuver. In this instance, however, the steering wheel is intended to remain stationary with respect to the rotational position, that is to say, not also rotate, in order to prevent injury to the vehicle driver. It is conventional to store the steering wheel in this instance in a retracted position. During this control, it is particularly desirable to rotationally lock the steering wheel.

US 2017/0369091 A1 discloses a steering column, which enables a change between manual and autonomous steering. The steering shaft of the steering column has an inner shaft and an outer shaft which during manual steering operation are connected in a torque-conducting manner and are uncoupled during autonomous steering operation. For an optimum manual steering operation of the known steering column, it is necessary for the outer shaft and the inner shaft to be connected in a play-free manner during manual steering operation.

By changing between manual steering operation and autonomous steering operation, however, the play-free connection between the outer shaft and the inner shaft deteriorates during manual steering operation.

Thus, a need exists for a steering shaft and a steering column that improve the play-free connection.

BRIEF DESCRIPTION OF THE FIGURES

FIG. 3 is a longitudinal sectional view of an example steering column in a state for manual operation (operating position).

FIG. 4 is a cross-sectional view through an upper cover of the steering column of FIG. 3.

DETAILED DESCRIPTION

Figure 1:
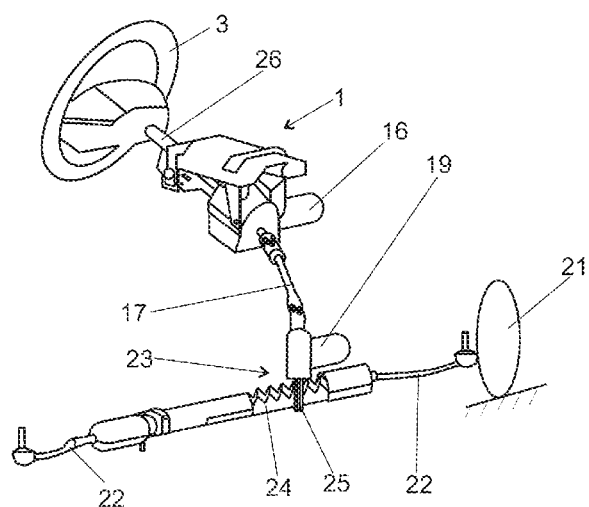
FIG. 1 is a schematic view of an example steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering shafts for steering columns of motor vehicles. In some examples, a steering shaft may comprise an inner shaft and an outer shaft, wherein the inner shaft has a sliding element having an outer profile portion, the inner shaft is at least partially arranged in the outer shaft and the outer shaft is arranged so as to be able to be displaced with respect to the inner shaft axially in the direction of a longitudinal axis between a storage position and an operating position.

The present disclosure further relates to steering columns for motor vehicles. In some examples, a steering column may comprise an inner covering pipe in which a steering shaft is rotatably supported, and an outer covering unit in which the inner covering pipe is retained.

In some examples, an outer shaft of a steering shaft has a bearing means having an inner profile portion, wherein the inner profile portion corresponds to the outer profile portion, wherein in the storage position the outer profile portion is at least partially received in the bearing means. Accordingly, with a steering shaft in the storage position the outer profile portion is at least partially, preferably completely received in the bearing means. This protects the material of the sliding element in that, both in the storage position and in the operating position, it is in a loaded state as a result of the contact with the bearing means. The undesirable deformation and the wear of the material as a result of the load-free state is accordingly prevented so that a play-free connection between the outer shaft and the inner shaft is provided in the operating position, according to which the outer shaft and the inner shaft are connected in a torque-conducting manner.

The storage position is in particular intended to be understood to mean that the outer shaft and consequently preferably a steering wheel which is connected to the outer shaft are moved toward the inner shaft in such a manner, in particular in a telescope-like manner, that is to say, so as to be able to be pushed together, that the outer shaft protrudes into a passenger compartment of the motor vehicle to a lesser extent compared with an operating position. Consequently, the length of the steering shaft in the storage position is shorter than in the operating position since it is pushed together.

The operating position is in particular intended to be understood to mean that the outer shaft and consequently preferably a steering wheel which is connected to the outer shaft has been moved away from the inner shaft in such a manner, in particular in a telescope-like manner, that the outer shaft protrudes into a passenger compartment of the motor vehicle to a greater extent compared with the storage position in order to facilitate or enable manual steering for the vehicle driver.

According to another advantageous embodiment of the steering shaft according to the invention, the bearing means is received in the outer shaft so as to be able to be rotated about the longitudinal axis. As a result of the bearing means being rotatably received in the outer shaft, the inner shaft and the outer shaft are uncoupled with respect to a torque transmission when the sliding element and the inner shaft are inserted into the bearing means and the steering shaft is therefore located in the storage position. The inner and outer shaft thus cannot be rotated together. Preferably, the bearing means is fixed in the outer shaft in the direction of the longitudinal axis.

According to another advantageous embodiment of the steering column according to the invention, the bearing means is constructed as a sleeve. This is advantageous since the bearing means can then be arranged in the outer shaft in particular in a gap-free manner with respect thereto.

According to another advantageous embodiment of the steering shaft according to the invention, the outer shaft and the inner shaft are connected in a positive-locking manner or coupled to each other in order to transmit a torque in the operating position. In this instance, the torque transmission is carried out from the outer shaft to the inner shaft or vice versa via the sliding element, that is to say, the torque flow is carried out through the sliding element. The positive-locking connection to the sliding element of the inner shaft in the operating position is preferably carried out by means of a positive-locking portion of the outer shaft. This contributes both to the material protection and to noise optimization. In this instance, the positive-locking portion is introduced into the outer shaft by shaping the outer shaft, wherein the shaping is preferably carried out after the bearing means have been introduced into the outer shaft.

According to another advantageous embodiment of the steering shaft according to the invention, the outer shaft has a positive-locking portion for positive-locking connection to the sliding element of the inner shaft in the operating position. This contributes both to the material protection and to noise optimization. In this instance, the positive-locking portion is preferably introduced into the outer shaft by shaping the outer shaft, wherein the shaping of the positive-locking portions is carried out after the bearing means have been introduced into the outer shaft. The positive-locking portions are preferably configured as bead-like recesses.

According to another advantageous embodiment of the steering shaft according to the invention, the positive-locking portion is introduced into the outer shaft by shaping the outer shaft. In this instance, bearing means are introduced into the outer shaft preferably prior to shaping of the positive-locking portion. In the context of the invention, it is conceivable and also possible for the outer shaft to have a plurality of positive-locking portions, which are in particular spaced apart with respect to each other in the direction of the longitudinal axis.

According to another advantageous embodiment of the steering shaft according to the invention, the bearing means comprises a metal or a plastics material. In a particularly preferred manner, the bearing means is formed from the metal or the plastics material or a mixture thereof.

According to another advantageous embodiment of the steering column according to the invention, the sliding element is constructed as a profile sleeve, wherein the profile sleeve is connected to the inner shaft in a non-movable manner. This improves the change from the operating position into the storage position or vice versa.

According to another advantageous embodiment of the steering shaft according to the invention, the sliding element is constructed as an overmolding of the inner shaft. The profile sleeve thus supports the positive-locking connection to the bearing means, particularly when it is configured as a sleeve, without requiring further coupling to the inner shaft, after which material wear and/or instabilities of the steering shaft according to the invention are prevented.

According to another advantageous embodiment of the steering shaft according to the invention, the bearing means has at least one positioning means for the flush positioning of the outer profile portion with the inner profile portion along the longitudinal axis. This is advantageous since the orientation of the bearing means with respect to the sliding means is thereby improved.

If the positioning means is constructed as a projection, this is even further improved.

According to another advantageous embodiment of the steering shaft according to the invention, the outer shaft is arranged in a latching star-like member for a steering lock. This improves the locking of the outer shaft with respect to malicious forces.

If the latching star-like member has a hollow profile having a longitudinal axis and a plurality of locking recesses, wherein the locking recesses can be brought into engagement with a locking bar of the steering lock which can be moved into a locking or unlocking position, the locking of the outer shaft with respect to malicious forces is even further improved.

The object is achieved with regard to the steering column in that the steering shaft is constructed in accordance with one or more of the appended claims and/or embodiments disclosed herein.

Additionally or alternatively, the steering column according to the invention which is provided in particular for a motor vehicle has a steering shaft which is rotatably supported in an upper cover, wherein a coupling element is coupled in a rotationally secure manner to the steering shaft, which has at least one positive-locking element, wherein the upper cover is displaceably received in a lower cover and can be displaced between a first position and a second position, wherein there is arranged on the lower cover a locking element which is in engagement with the positive-locking element in the first position and is out of engagement in the second position. The two-part structure of the locking device, which is formed by the locking element and the coupling element and in which one component—the locking element—is arranged on the lower cover, enables a space-saving construction of the cover cross section. Preferably, the locking element is arranged in a radially movable manner on the lower cover. This enables a particularly space-saving construction of the upper and lower cover since no space is required for an azimuthal or axial movability of the locking element—the locking element is only carrying out a movement along a surface normal of the upper cover. A locking of the steering wheel is possible for the driver using the steering column according to the invention simply by moving the upper cover and steering wheel from an extended, second position, also referred to as the operating position, into a retracted first position, also referred to as the storage position.

There is further provision for the steering shaft to comprise an outer shaft and an inner shaft, wherein these can be rotated relative to each other in the first position and, in the second position, are coupled to each other in a torque-conducting manner.

This embodiment enables both autonomous control of the motor vehicle, when the two shafts are uncoupled in the first position, and manual control, with the inner shaft and outer shaft coupled in the second position. Furthermore, it facilitates precise positioning of the positive-locking element with respect to the locking element, wherein the engagement of the locking element in the positive-locking element is intended to precisely correspond to a straight-ahead position of the wheels.

According to another embodiment of the invention, the upper cover has a recess through which the locking element protrudes in the first position. This enables the positive-locking element and locking element to be brought into engagement by means of a purely axial displacement of the upper cover.

There is further provision for the locking element to have at least one control face which cooperates with a counter-control face of the upper cover in such a manner that the locking element is moved into engagement or out of engagement with the positive-locking element by displacing the upper cover with respect to the lower cover. In particular, the control face has an angle between 10° and 75° with respect to the counter-control face. As a result of it being possible to form a radial force component which raises the locking element, this embodiment facilitates the locking element and positive-locking element being brought out of engagement.

Preferably, the locking element is constructed with a polyhedral, in particular truncated-pyramid-like, or frusto-conical geometry, in particular with a control face which is formed on the covering face of the locking element, which further improves the cooperation of the counter-control face and control face, particularly when the positive-locking element and locking element are brought out of engagement.

In another embodiment of the invention, there is provision for the locking element to be pretensioned by means of a spring.

A relaxation of the spring is in particular enabled during a locking movement of the locking element, that is to say, when brought into engagement with the positive-locking element. The pretensioning of the spring must accordingly be applied again in order to move the locking element and positive-locking element out of engagement, whereby a rotationally secure engagement of the locking element in the positive-locking element is enabled and enables compensation of torques greater than 300 Nm in the locking state.

There is further provision for profile sleeves or an over-molding to be arranged between the inner and outer shaft of the steering shaft. They enable, with a comparatively simple production, a stable connection of the inner and outer shaft with manual steering in the second position. Since a contact of the shafts takes place only at the profile sleeves, only the profile sleeves have to be replaced in the event of wear.

There is further provision for the coupling element to be constructed as a latching star-like member. The embodiment with detents determines an azimuthal detent angle of the outer shaft which corresponds to the detent, preferably in a straight-ahead position. It enables an operationally reliable, rotationally secure coupling of the coupling element and outer shaft and, when the locking element is engaged in the coupling element, a secure axial guiding of the locking element.

According to another embodiment, the positive-locking element extends over an axial length of the coupling element. This enables deeper introduction of the upper cover into the lower cover after the locking element and positive-locking element have been brought into engagement. Consequently, it is advantageously made possible for the inner shaft and outer shaft to be uncoupled in the already locked state of the outer shaft. This in turn ensures the azimuthal positioning of the steering wheel in the locked state, which should correspond to a straight-ahead position of the wheels.

Furthermore, there is provision for the positive-locking element to be constructed as a rectangular groove. Consequently, a comparatively simple embodiment of the locking element, with stable engagement and secure guiding, is enabled.

Preferably, a motorized adjustment drive is arranged between the upper cover and the lower cover, wherein this adjustment drive is constructed in order to move the upper cover and the lower cover back and forth between the first position and the second position.

In an alternative embodiment, there may be provision for the upper cover to be able to be manually adjusted with respect to the lower cover, wherein there is further provided a fixing device which can be switched between a release position and a fixing position, wherein in the release position the upper cover can be adjusted with respect to the lower cover and in the fixing position the upper cover is secured with respect to the lower cover.

Between the upper cover and the lower cover, an energy absorption device may be provided, wherein this is constructed in order to absorb energy in a controlled manner in the event of an accident-related vehicle crash.

FIG. 1 is a schematic illustration of a steering system for a motor vehicle. This comprises a steering column 1 which is connected via an intermediate steering shaft 17 to a steering gear mechanism 23. The steering column 1 has a steering shaft 26, to the rear end of which when viewed in the travel direction a steering wheel 3 is fitted. The steering shaft 26 comprising an outer shaft 4 and an inner shaft 5 is coupled to an intermediate steering shaft 17 in a torque-conducting manner, wherein this intermediate steering shaft 17 is further coupled to a steering gear mechanism 23. The steering drive 16, 19 which is constructed as an electromechanical servo unit comprises an adjustment motor and may be arranged at various locations of the steering system for example, on the steering column 1 or on the steering gear mechanism 23, wherein generally only one steering drive in the form of an electromechanical servo unit is provided. A steering adjustment torque is converted by means of a pinion 25 and a toothed rack 24 into a translation movement of tie rods 22, whereby a steering angle of the steered wheels 21 is brought about.

Figure 2:
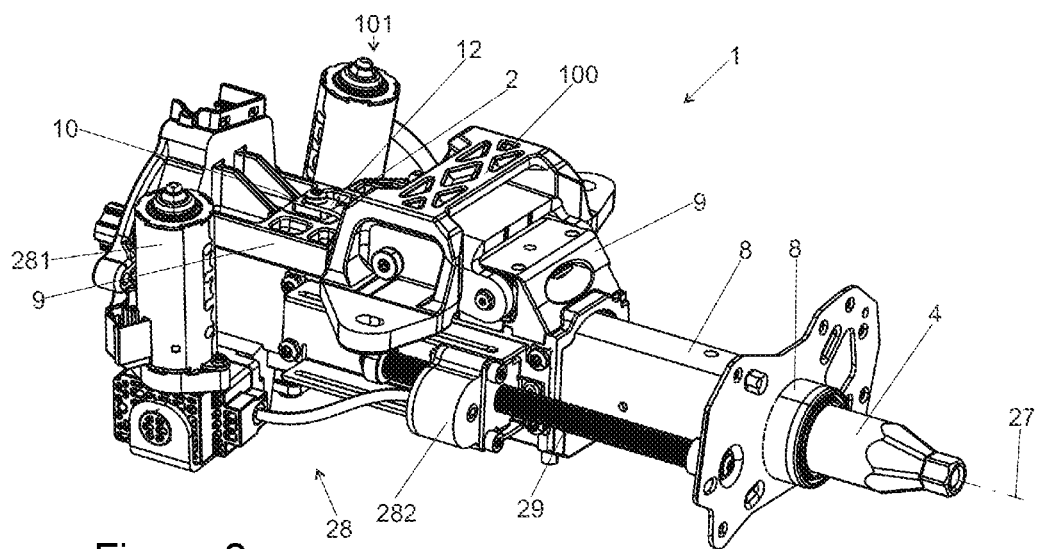
FIG. 2 is a perspective view of an example steering column.

FIG. 2 is a perspective illustration of an installed embodiment of a steering column 1 according to the invention. An upper cover 8, which is constructed as an inner cover, can be introduced into a lower cover 9 which is constructed as an outer cover, whereby a storage of a steering wheel 3 which is not illustrated here in a retracted first position is enabled. In the stored state, the upper cover 8 is introduced to the greatest possible extent into the lower cover 9. For axial displacement of the upper cover 8, a longitudinal adjustment drive 28 which drives a threaded rod 29 is provided. The longitudinal adjustment drive 28 comprises an electric motor 281 and a gear unit 282. The steering wheel 3 can be coupled to an outer shaft 4 of a steering shaft which is rotatably supported within the upper cover 8 and which can be rotated during rotation about a rotation axis 27. In the stored position of the steering column, the rotatability thereof is blocked by means of a locking device 2 which has a locking element 10. The locking element 10 is arranged via a spring 12 on the lower cover 9 and guided therein so as to be able to be displaced in a direction orthogonal to the rotation axis 27.

The lower cover 9 is preferably supported by a console 100, wherein the console can be connected to the motor vehicle. There is provided between the console 100 and the lower cover 9 a motorized height adjustment drive 101 which is configured so as to pivot the cover 9 with respect to the console 100 about a pivot axis and consequently to produce a height adjustment.

FIG. 3 illustrates an embodiment of a steering column 1 according to the invention as a longitudinal section in the state for manual operation in an operating position, in accordance with the second position of the upper cover 8. In this state, the steering column, or more specifically the upper cover 8 is located in a non-stored position, the upper cover 8 is extended with respect to the lower cover 9. The outer shaft 4 of the steering shaft is rotatably supported by means of a bearing 30 within the upper cover 8, wherein the bearing 30 is constructed as a roller bearing. An inner shaft 5 is also arranged inside the upper cover 8. This is arranged at an axial end 34 in a first portion 31 of the outer shaft 4 and can be releasably connected thereto. In the illustrated manual operating state of the steering column 1, the outer shaft 4 and inner shaft 5 are connected in a torque-conducting manner so that both rotate when the steering wheel 3 is rotated about a common rotation axis 27. A sleeve 15 is coaxially arranged within a second portion 32 of the outer shaft 4, wherein it is received in the outer shaft 4. As an additional component of the locking device 2, there is arranged on the outer shaft 4 a coupling element 6 which radially surrounds the outer shaft 4. The locking element 10 is pretensioned by means of a spring 12 and in the non-locked state, that is to say, when the locking element 10 and coupling element 6 are not brought into engagement. The locking element 10 is displaceably guided in an opening 900 of the outer cover 9.

FIG. 4 shows the steering column 1 from FIG. 3 as a cross section along the line A-A which is illustrated in FIG. 3. The outer shaft and inner shaft 4, 5 which are arranged radially partially inside each other and the upper cover 8 which surrounds it and the lower cover 9 which partially axially surrounds it are illustrated. Also illustrated is the sleeve 15 which is produced in such a manner that it can be received in a rotationally secure manner the inner shaft 5 when the inner shaft 5 is introduced into the outer shaft 4. In the embodiment illustrated, the coupling element 6 is constructed as a latching star-like member and radially surrounds the outer shaft 4. A positive-locking element 7 is constructed in the form of a rectangular groove 35 on the coupling element 6. The latching star-like member may preferably be constructed as an extruded component or shaped component.

Figure 5:
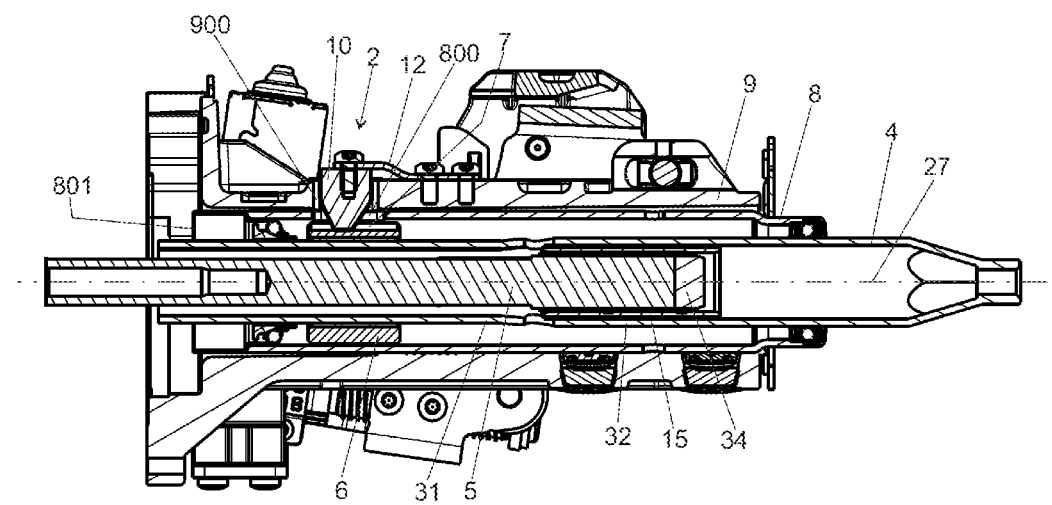
FIG. 5 is a longitudinal sectional view of the steering column according to FIG. 3 in a state for autonomous operation (storage position).
Figure 6:
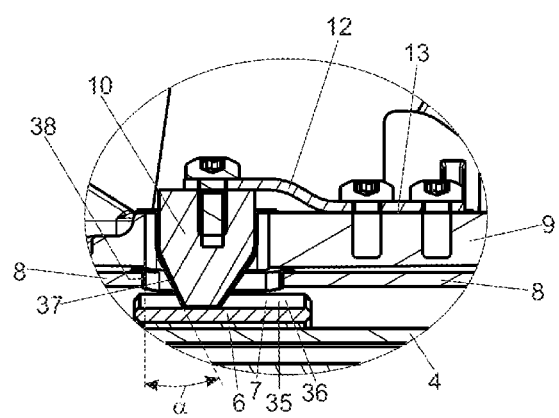
FIG. 6 is a cut-out from FIG. 5 with a locking element locked.

In FIG. 5, the steering column of FIG. 3 is illustrated in longitudinal section in the state for autonomous operation. In this illustration, the upper cover 8 is in a storage position and the steering shaft is in a locked and uncoupled position. The upper cover 8 is inserted into the lower cover 9. Consequently, the axial end 34 of the inner shaft 5 is now arranged in a second portion 32 of the outer shaft and is introduced at that location into the sleeve 15 and connected in a rotationally secure manner thereto. A rotation of the inner shaft 5 now brings about a rotation of the sleeve 15 which can in turn be rotated relative to the outer shaft 4 by means of the acting torque. A rotation of the outer shaft and inner shaft 4, 5 is accordingly in the illustrated position mutually uncoupled so that the outer shaft 4 can be rotated relative to the inner shaft 5. The inner shaft 5 is during a steering maneuver rotated by the servo unit in the form of a steering drive. As a result of the solution according to the invention, however, the outer shaft does not also rotate. This is rotationally stationary. The inner shaft 5 rotates in this instance together with the sleeve 15, where it rotates relative to the outer shaft 4. As a result of the axial displacement of the upper cover 8 and the outer shaft 4 relative to the lower cover 9 and the inner shaft 5, the coupling element 6 is moved to an axial height with the locking element 10. The upper cover 8 accordingly has at the axial position of the coupling element 6 a recess in the form of an opening 800. This enables an engagement of the locking element 10 in the coupling element 6. The locking element 10 consequently protrudes in the locked state, as illustrated in FIGS. 5 and 6, through the opening 900 of the lower cover 9 and through the opening 800 of the lower cover 8. The locking element 10 is produced in this illustration as a locking pin with a truncated-pyramid-like or frustoconical geometry and engages in the positive-locking element 7, whereby the coupling element 6 is locked and the outer shaft 4 can no longer be rotated. The steering wheel is accordingly locked, but the inner shaft 5 can be rotated further, which further enables transmission of a now automatically generated steering command via the servo unit to the wheels. The engagement of the locking element 10 in the positive-locking element 7 and consequently the locking of the steering wheel take place prior to the uncoupling of the inner and outer shaft 5, 4, whereby the azimuthal position of the locked components, in particular the steering wheel, can be fixed in a position which, with manual steering, corresponds to a straight-ahead position of the wheels.

FIG. 6 shows a cut-out from FIG. 5 with a locked locking and coupling element 10, 6. As a result of the pretensioning of the spring 12 and the pressing thereof against a counterface 13 which is arranged on the upper cover 8 in the second non-stored position, a resilient force component acts in a radially inward direction, that is to say, acting in the direction toward the steering shaft or inner shaft 5. The upper cover 8 has at the end face a first control face 801, wherein it is the end face which is received in the lower cover 9. When the upper cover 8 is inserted into the lower cover 9, the recess 800 is moved to the axial height of the locking element 10. The pretensioned spring 12 is consequently able to relax as a result of a radial movement of the locking element 10 which is directed in an orthogonal direction of the rotation axis 27 into the recess 800 of the upper cover 8. The radially inwardly directed movement of the locking element 10 leads to the locking element 10 being brought into engagement with the positive-locking element 7 which in the embodiment shown is constructed as a groove 37. As a result, the locking element 10 is retained in the locked position even when a torque acts on the coupling element 6, the coupling element 6 can no longer be rotated and consequently the outer shaft also cannot be rotated. The oblique construction of the control face 37 formed by the covering face of the locking element 10 relative to a surface 36 of the coupling element 6 facilitates a release of the locking when the upper cover 8 is moved into the second, extended position. A counter-control face 38 of the upper cover 8, against which face 38 the locking element 10 presses when the upper cover 8 is extended, is not parallel with the contacted control face 37 of the locking element 10. An advantageous embodiment is shown in which the control face 37 and counter-control face 38 are arranged relative to each other at an obtuse angle α, in particular at an angle α between 10° and 75°. Consequently, a force can be readily directed radially outward, which brings about a lifting of the locking element 10 via the application of the pretensioning/tensioning of the spring 12, whereby the locking element 10 and positive-locking element 7 can be brought out of engagement again. When the upper cover 8 is inserted into the lower cover 9, a second control face 37a of the locking element 10 cooperates with the control face 801 of the upper cover 8 so that, when the upper cover 8 is inserted, the locking element 10 is pressed with the second control face 37a against the control face 801 of the cover 8 and consequently to move the locking element 10 to be moved in a direction orthogonal relative to the rotation axis 27. The control face 37a and the control face 801 of the cover 8 are arranged at an angle relative to each other, wherein the angle preferably has a value between 10° and 75°.

Figure 7:
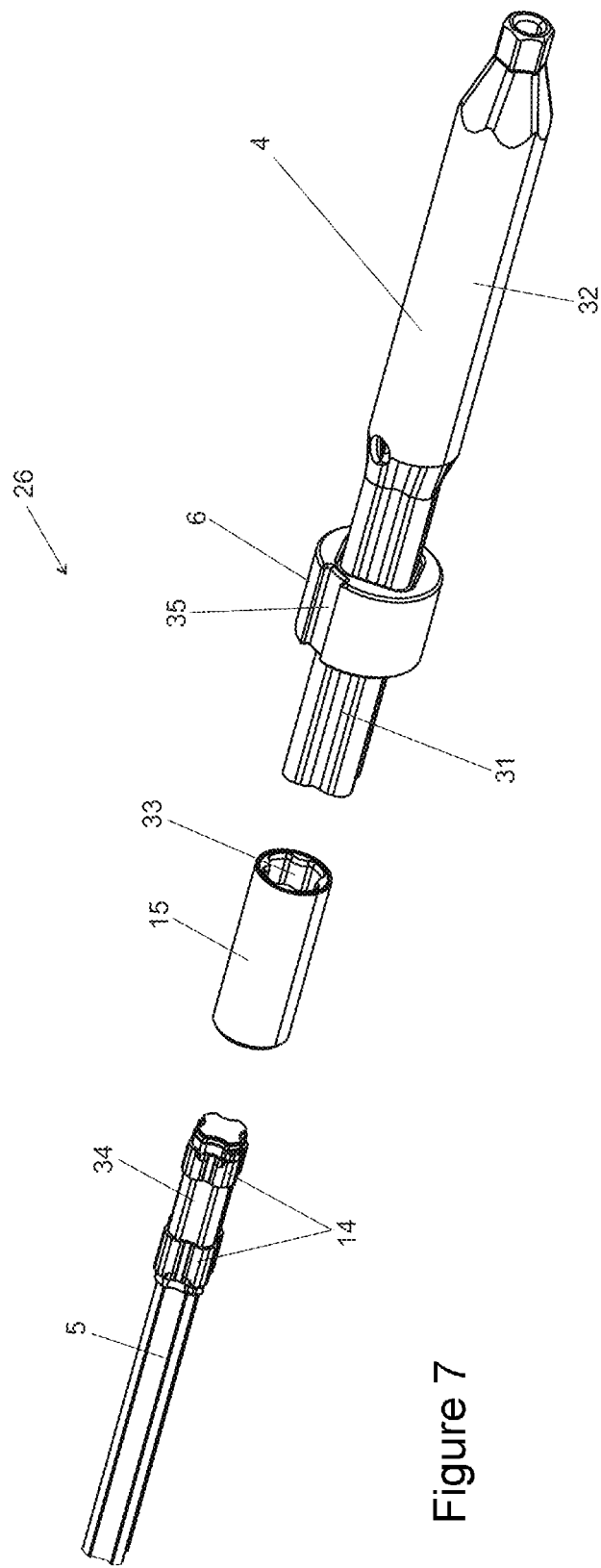
FIG. 7 is a partially exploded perspective view of an inner shaft and an outer shaft.

FIG. 7 shows the steering shaft 26 in a partially exploded illustration, wherein it has the inner shaft 5 and outer shaft 4 with the coupling element 6 which is constructed as a latching star-like member. In the embodiment shown, the coupling of the inner and outer shaft 5, 4 during manual operation, and the uncoupling thereof when the inner shaft is coupled to the sleeve 15 is clear. The two portions 31, 32 of the outer shaft 4 each have different profiles and inner radii, in this instance the second portion 32 is constructed in the form of a circular pipe and the first portion 31 in the form of a polygonal shaft. The inner shaft 5 is also constructed as a polygonal shaft. In a state radially surrounding the inner shaft 5, there are further arranged two profile sleeves 14 whose outer cover forms the polygonal shape of the inner shaft 5. However, there may also be provision for only a single profile sleeve which is fixed to the inner shaft to be used. The profile sleeve or profile sleeves is/are preferably formed from a plastics material. During manual operation, the axial end 34 of the inner shaft 5 is located in the first portion 31 of the outer shaft 4. The regions in which the inner shaft 5 is surrounded by the profile sleeves 14 accordingly have peripheries which are increased in accordance with a width of the profile sleeves 14. Since an outer radius of the profile sleeve 14 is greater than an inner radius of the first portion 31 of the outer shaft 4, the inner shaft 5 cannot be rotated with the profile sleeves 14 counter to the outer shaft 4. Both are coupled in a rotationally secure manner, which is a prerequisite for the manual operation of the steering column. The sleeve 15 is supported inside the second portion 32 of the outer shaft 4. The sleeve 15 has an inner sleeve profile 33 which corresponds to an inner profile of the first portion 31 of the outer shaft 4. When the steering wheel is stored, the inner shaft 5 is inserted more deeply into the outer shaft 4 and the axial end 34 is arranged in the second portion 32 of the outer shaft 4—the inner shaft 5 is introduced into the sleeve 15. The profile sleeves 14 now form a positive-locking connection to the inner sleeve profile 33 and the inner shaft 5 and sleeve 15 are connected in a rotationally secure manner. Since the sleeve 15 is only supported in the outer shaft 4 in a sliding manner, the sleeve can be rotated when the inner shaft 5 is rotated relative to the outer shaft 4 and the rotation of the inner shaft and outer shaft 5, 4 is uncoupled. In other words, the sleeve 15 is supported in a sliding manner in the outer shaft. As a result of the now profile-sleeve-free portion of the inner shaft 5 inside the first portion 31 of the outer shaft 4, there is no longer a positive-locking connection between them and a relative rotation is enabled. In the preferred embodiment illustrated, the coupling element 6 radially surrounds the outer shaft 4 and is connected thereto in a rotationally secure manner. Furthermore, the rectangular groove 35 of the positive-locking element 7 extends over an axial length of the coupling element 6. This enables a deeper introduction of the inner shaft 5 into the outer shaft 4 in the already locked state of the locking element 10 and coupling element 6. An uncoupling of the inner and outer shaft 5, 4 which takes place only after the locking is thereby enabled. The outer shaft 4 illustrated in FIG. 7 is the outer shaft 4 after the first portion 31 has been formed with the positive-locking profile in the outer shaft 4, wherein, purely for ease of illustration, the sleeve 15 is illustrated outside the outer shaft 4. The sleeve 15 is joined before the forming of the positive-locking profile of the portion 31 in the outer shaft.

What is claimed is:

1. A steering shaft for a steering column of a motor vehicle, the steering shaft comprising:
   an inner shaft with a sliding element having an outer profile portion; and
   an outer shaft in which the inner shaft is at least partially disposed, wherein the outer shaft is configured to be displaced relative to the inner shaft axially in a direction of a longitudinal axis between a storage position and an operating position, wherein the outer shaft includes a bearing means having an inner profile portion that corresponds to the outer profile portion, wherein in the storage position the outer profile portion is at least partially received in the bearing means, and wherein the bearing means is received in the outer shaft such that the bearing means is rotatable about the longitudinal axis.

2. The steering shaft of claim 1 wherein the bearing means is a sleeve.

3. The steering shaft of claim 1 wherein the outer shaft and the inner shaft are connected in a positive-locking manner for transmitting torque in the operating position.

4. The steering shaft of claim 1 wherein the outer shaft has a positive-locking portion for a positive-locking connection to the sliding element on the inner shaft in the operating position.

5. The steering shaft of claim 4 wherein the positive-locking portion comprises a shaping of the outer shaft.

6. The steering shaft of claim 1 wherein the bearing means comprises metal or plastic.

7. The steering shaft of claim 1 wherein the sliding element is a profile sleeve that is connected to the inner shaft in a non-movable manner.

8. The steering shaft of claim 1 wherein the sliding element is an overmolding of the inner shaft.

9. A steering shaft for a steering column of a motor vehicle, the steering shaft comprising:
   an inner shaft with a sliding element having an outer profile portion; and an outer shaft in which the inner shaft is at least partially disposed, wherein the outer shaft is configured to be displaced relative to the inner shaft axially in a direction of a longitudinal axis between a storage position and an operating position, wherein the outer shaft includes a bearing means having an inner profile portion that corresponds to the outer profile portion, wherein in the storage position the outer profile portion is at least partially received in the bearing means, wherein the bearing means includes positioning means for flush positioning of the outer profile portion with the inner profile portion along the longitudinal axis.

10. The steering shaft of claim 9 wherein the positioning means is a projection.

11. The steering shaft of claim 1 wherein the outer shaft is disposed in a latching member for a steering lock.

12. The steering shaft of claim 11 wherein the latching member has a hollow profile with a longitudinal axis and locking recesses, wherein the locking recesses are configured to engage with a locking bar of the steering lock that is movable into a locking position or an unlocking position.

13. A steering column for a motor vehicle, the steering column comprising:
an inner covering pipe;
a steering shaft rotatably supported in the inner covering pipe, wherein the steering shaft comprises:
an inner shaft with a sliding element having an outer profile portion, and
an outer shaft in which the inner shaft is at least partially disposed, wherein the outer shaft is configured to be displaced relative to the inner shaft axially in a direction of a longitudinal axis between a storage position and an operating position, wherein the outer shaft includes a bearing means having an inner profile portion that corresponds to the outer profile portion, wherein in the storage position the outer profile portion is at least partially received in the bearing means, and wherein the bearing means is a sleeve; and
an outer covering unit in which the inner covering pipe is retained.

14. The steering column of claim 13 wherein the bearing means is received in the outer shaft such that the bearing means is rotatable about the longitudinal axis.

15. The steering column of claim 13 wherein the outer shaft and the inner shaft are connected in a positive-locking manner for transmitting torque in the operating position.

16. The steering column of claim 13 wherein the outer shaft has a positive-locking portion for a positive-locking connection to the sliding element on the inner shaft in the operating position.

17. The steering column of claim 16 wherein the positive-locking portion comprises a shaping of the outer shaft.

18. The steering column of claim 13 wherein the sliding element is a profile sleeve that is connected to the inner shaft in a non-movable manner.

\* \* \* \* \*